United States Patent Office 3,664,700
Patented May 23, 1972

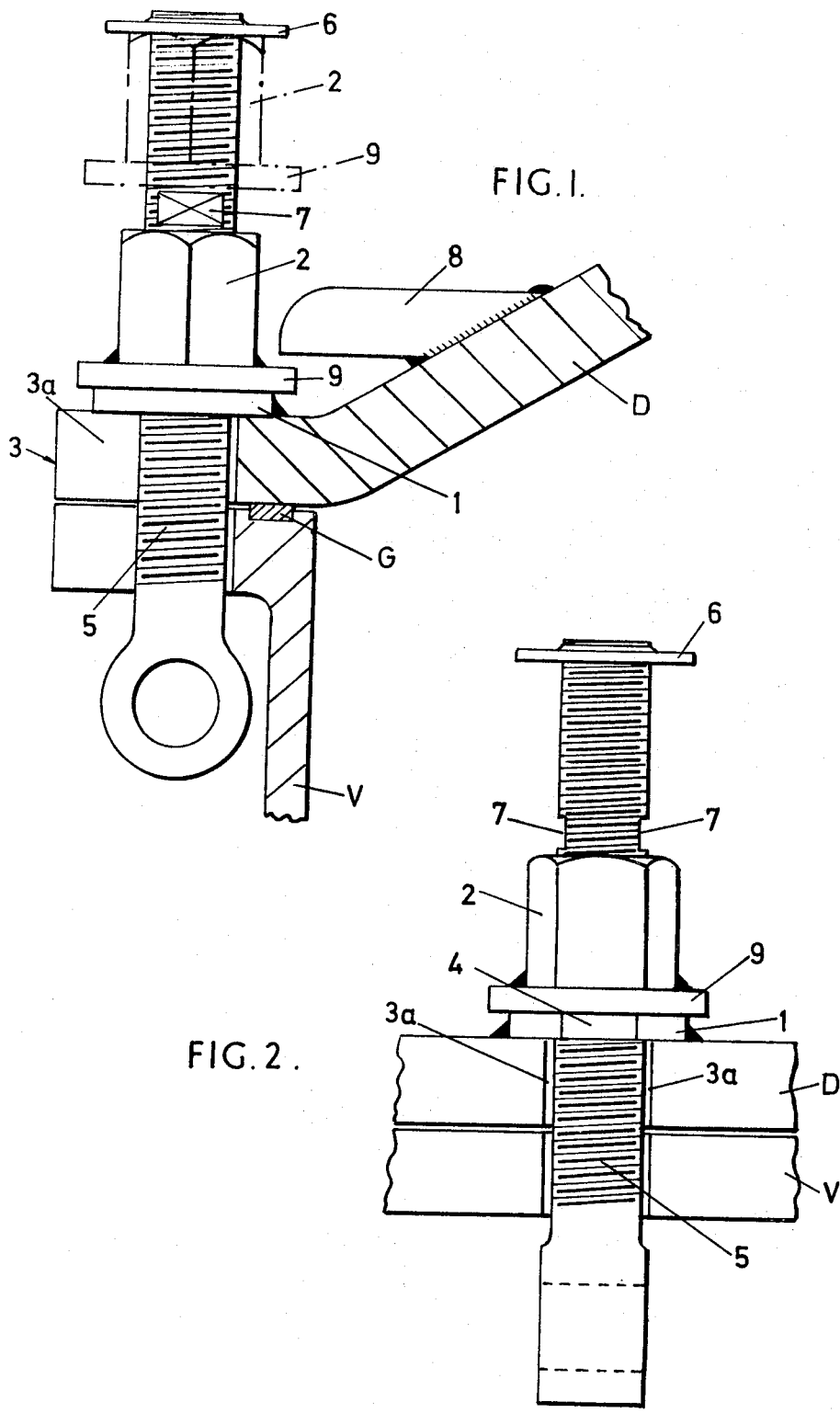

3,664,700
SWING BOLTS
Henry Maurice Hattersley Pickard, Stanningley, Pudsey, England
Filed Jan. 5, 1971, Ser. No. 103,987
Int. Cl. B65d 45/30
U.S. Cl. 292—256.75
3 Claims

ABSTRACT OF THE DISCLOSURE

Swinging of a swing bolt on the door of a pressure vessel to a release position is only possible when a securing nut has been slackened sufficiently on the bolt to uncover a portion of the bolt formed with opposed flats which present a reduced diameter portion of the bolt which can pass through a restricted space when the bolt is swung. The door is also formed with a stop or lug which is engaged by said nut when commencing to slacken the nut to forcibly open the door should it "stick" and before the bolt is free to swing.

CROSS REFERENCES TO RELATED APPLICATIONS

United Kingdom application No. 17687/69 dated Apr. 3, 1969.

BACKGROUND OF THE INVENTION

This invention relates to swing bolts and particularly swing bolts which could possibly be subjected to an unexpected force which should be resisted by the bolt to prevent accidents and possible injury to personnel.

More particularly, although not exclusively, the invention is concerned with swing bolts for doors of pressure vessels such as storage tanks, autoclaves and the like.

In the case of bolted doors on autoclaves, it is usual to hold the doors tightly closed by swing bolts because they are much more convenient to manipulate than loose bolts. Obviously, the operator has to undo the nut on each bolt quite a little beyond the point at which it applies no pressure to the door, in order that it can swing freely over the outside of the door flange. This movement is often magnified by making or machining the door flange in such a way that the face against which the nut tightens is lower than the edge over which the nut must swing. This is an important safety feature which must often have arrested unexpected sudden opening of the door and saved many accidents, but it is not a guarantee that no accident will take place.

Because accidents to bolted doors are not common, many people imagine them to be inherently safe, but this is not so, and even the arrangement described above utilising swing bolts does not prevent some accidents taking place.

The object of the present invention is to improve still further the safety factor of arrangements in which doors of pressure vessels are held tightly closed by swing bolts.

SUMMARY OF THE INVENTION

Broadly, according to one aspect of this invention, there is provided a pressure vessel wherein the door is held tightly closed by swing bolts and which is characterised in that one or more of said swing bolts is arranged with its shank extending through a washer fixedly secured to or formed integral with the door flange, the said washer being formed with a slot having a width which is less than the diameter of the bolt and the latter being formed with diametrically opposed flats normally covered by the nut of the bolt, and which when exposed by slackening the nut, present a reduced thickness of bolt to the slot in the washer to permit the bolt to be swung to a release position, the nut being held against complete removal from the bolt.

According to a preferred embodiment of the invention, the door is fitted or formed with a stop or lug and said nut is provided with a flange which, as the nut is being undone, will engage said lug on the door and forcibly open the door little by little before the slot in the washer comes opposite the flats in the bolt.

According to a modification, a portion of the bolt is formed with no thread until it reaches the portion where the slot can register with the flats on the bolt to prevent damage to the thread if the bolt is swung prematurely.

With the arrangement provided by this invention any unexpected violent opening of the door, due say to internal pressure, is arrested by the nut of the bolt which cannot be screwed off the end of the bolt. Should no unexpected violent opening of the door take place then the bolt can be swung to a release position after the nut has been unscrewed sufficiently to expose the reduced diameter portion thereof and the door opened far enough to bring the slot in the washer opposite tthe slots in the bolt.

The invention also includes the provision of swing bolts fitted with captive nuts and formed with said reduced diameter portions for use in conjunction with doors for pressure vessels and for analogous purposes.

BRIEF DESCRIPTION OF THE DRAWINGS

FIG. 1 is a part sectional side elevation of the swing bolt in a locking position.

FIG. 2 is a view taken in a plane at right angles to FIG. 1.

DESCRIPTION OF PREFERRED EMBODIMENTS

Figure 3:
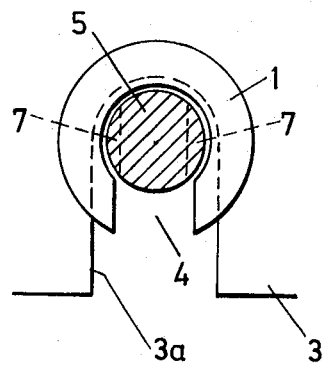
FIG. 3 is a plan view with the nut omitted.

Referring to said drawings, it is very common to have a thick washer 1 under the nut 2 because this spreads the pressure of the nut 2 over a wider area of the door flange 3 and no doubt reduces wear on the flange, but it does not of itself improve the safety factor. With the present invention this washer is fixed, for example welded to the flange instead of being loose. The washer 1 is formed with a slot 4 in it to allow the swing bolt 5 to swing out of the way. The slot 4 is, however, as shown in FIGS. 2 and 3, appreciably narrower than the bolt diameter; for example in the case of a 1" bolt this slot should be about ¾" wide. The flange 3 is also formed with a slot 3a which, of course, is wider than the slot 4 to allow the full diameter of the bolt 5 to pass therethrough.

One or two of these washers 1 are fixedly secured to the flange 3, preferably diametrically opposite the hinged side of the door D. As will hereinafter become apparent the invention need only be applied to one or two of the swing bolts and the remaining bolts can be conventional ones.

The swing bolts of this invention are made longer than the conventional ones and are provided at their outer ends with abutments 6, so that the nuts 2 cannot be removed once they have been put on.

In each of these long bolts a flat 7 is cut at each side slightly more than ⅛" deep which would mean that little more than the thread is removed on two sides, so that when the fixed washers 1 are opposite this reduced portion, the swing bolts 5 can be swung out of the way, but only when the door 3 is slightly open and in the position to bring the slots 4 opposite the flats 7. Assuming the nut 2 is say 1¼" thick, the flats 7 in the bolt 5 will be so positioned that when the nut 2 is tight, the flats 7 are somewhere near the top face of the nut 2, as shown in FIG.

1. In this way the flats 7 will have no weakening effect upon the strength of the bolt 5 when it is taking the load. The length of the bolt 5 should, of course, be so determined that when the nut 2 is fully undone, as indicated in FIG. 1 in chain-dotted outline, the flats 7 are fully uncovered.

In this way it will be necessary for the door D to open about 1″ before the particular swing bolts of this invention can be swung sideways, and should it be that as soon as the door comes open it is obvious that the vessel is not empty, it will probably still be possible to retighten these bolts and then swing the other conventional bolts into position and tighten them. Alternatively, if this is impossible, it will at least prevent the door from swinging open and possibly inflicting an injury on someone, and will ensure that the contents of the vessel V can only come out comparatively slowly compared with what would happen if the door swung wide open suddenly.

Possibly the most likely cause of a bolted door causing an accident (apart from failure due to overpressure) is if the door sticks to the gasket G so that when the bolts are unfastened with only a very low pressure inside, the door does not open at all. If all the bolts are swung back when such a door is pulled open, the door may then swing dangerously.

In addition to the above, danger may result from liquid contents coming out from a vessel which was thought to be empty, rather than from the actual swinging of the door. The door or cover may well be at or near the bottom of the side of a storage tank, which of course may contain a dangerous or inflammable fluid so that there is a dangerous situation set up if much leaks. If the gasket sticks with the present known arrangements it is quite possible for the door to be fully unfastened with no apparent leakage, and then when the door is pulled free, or comes free because of the weight inside, a large quantity of the liquid could flow out with serious potential danger, even if the level of the liquid is only slightly above the bottom of the opening. If one or two of the swing bolts as herein described is or are fitted, this danger is prevented.

To eliminate risk of injury due to a door sticking, as mentioned in the preceding paragraph, the present invention also includes the provision of a stop or lug 8 (FIG. 1) which is very securely welded or otherwise suitably secured to the door D, and the nut 2 is formed or fitted with a flange 9 which, as the nut 2 is being undone, will very quickly engage with the lug and forcibly open the door little by little long before the slot 4 in the washer 1 comes opposite the flats 7 in the bolt.

Figure 4:
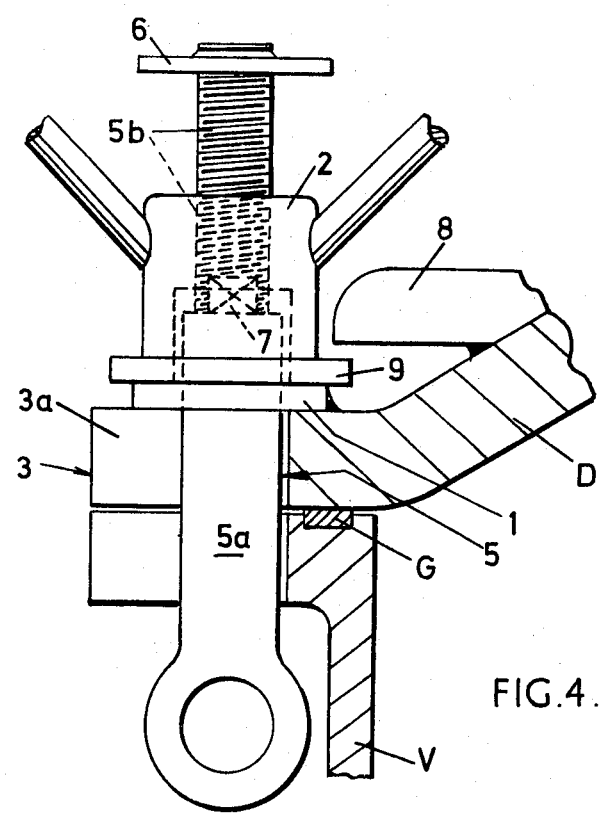
FIG. 4 is a view similar to FIG. 1 illustrating a modification.

Although it is not likely to happen, it could well be that if an operator repeatedly tries to swing the bolt 5 out of the way before the slot 4 in the washer 1 registers with the flats 7 in the bolt, the washer will engage the thread of the bolt and damage same. This is avoided by the modification illustrated by FIG. 4, according to which the portion 5a of the bolt has no thread on it and is made of a larger diameter until it reaches the portion 5b formed with the threads 7. Thus, if the bolt 5 is swung prematurely the washer does not hit any part of the thread.

Should it be that the anticipated trouble is due to a plug of semi-solid material or sediments on the inside, this difficulty might be overcome by fitting one or more projections on the inside of the door, long enough to project into the plug so that opening the door about one inch would be sufficient to disturb the plug so as to make sure that this sudden collapsing of the plug could not take place after the door had been opened wide. Preferably a projection is fitted on the inside of the door in a low-down position.

I claim:

1. A pressure vessel, storage tank or the like, wherein the door is held tightly closed by swing bolts, characterised in that one or more of said swing bolts is arranged with its shank extending through a washer fixedly secured to or formed integral with the door flange, each of said bolts including a nut, the said washer being formed with a slot having a width which is less than the diameter of the bolt, and the latter being formed with diametrically opposed flats normally covered by the nut of the bolt and which, when exposed by slackening the nut, present a reduced thickness of bolt to the slot in the washer to permit the bolt to be swung to a release position, the nut being held against complete removal from the bolt.

2. A pressure vessel as claimed in claim 1, wherein the door is fitted or formed with a stop or lug and said nut is provided with a flange which, as the nut is being undone, will engage said lug on the door and forcibly open the door little by little before the slot in the washer comes opposite the flats in the bolt.

3. A pressure vessel as claimed in claim 1, wherein a portion of the bolt is formed with no thread until it reaches the portion where the slot can register with the flats on the bolt to prevent damage to the thread if the bolt is swung prematurely.

References Cited
UNITED STATES PATENTS

| | | | |
|---|---|---|---|
| 2,113,776 | 4/1930 | Smith | 220—55.1 |
| 2,728,552 | 12/1955 | Fate | 254—197 |
| 2,752,187 | 6/1956 | Gordon | 202—256.75 |

ROBERT L. WOLFE, Primary Examiner

U.S. Cl. X.R.

292—54